US006003644A

United States Patent [19]

Tanaka

[11] Patent Number: 6,003,644

[45] Date of Patent: Dec. 21, 1999

[54] DAMPING FORCE VARIABLE HYDRAULIC SHOCK ABSORBER

[75] Inventor: Akira Tanaka, Iwata, Japan

[73] Assignee: Yamaha Hatsudoki Kabushiki Kaisha, Iwata, Japan

[21] Appl. No.: 08/885,401

[22] PCT Filed: Nov. 5, 1996

[86] PCT No.: PCT/JP96/03230

§ 371 Date: Jun. 30, 1997

§ 102(e) Date: Jun. 30, 1997

[87] PCT Pub. No.: WO97/17556

PCT Pub. Date: May 15, 1997

[30] Foreign Application Priority Data

Jul. 11, 1995 [JP] Japan .................................... 7-289002

[51] Int. Cl.[6] ........................................................ F16F 5/00

[52] U.S. Cl. .................................... 188/266.5; 188/266.2; 188/266.6

[58] Field of Search ............................. 188/266.1–266.7, 188/319.1, 319.2, 322.13, 322.15

[56] References Cited

U.S. PATENT DOCUMENTS 5,085,299 2/1992 Siess et al. .............................. 188/319
5,129,489 7/1992 Masiura et al. ...................... 188/266.7
5,303,804 4/1994 Spiess ..................................... 188/319
5,409,088 4/1995 Sanstevod ............................ 188/319.1
5,501,307 3/1996 Laus ....................................... 188/319
5,533,597 7/1996 Mezu et al. .......................... 188/266.4
5,850,896 12/1998 Tanaka ................................ 188/299.1

*Primary Examiner*—Chris Schwartz
*Attorney, Agent, or Firm*—Knobbe, Martens, Olson & Bear LLP

[57] ABSTRACT

In a damping force variable hydraulic shock absorber 6 including a main valve 18 for opening and closing a main passageway 19 communicating with two main oil chambers 7*a*, 7*b* defined by a piston 9 within a cylinder 7, an auxiliary oil chamber 31 for causing a pressure within a high pressure side one of the oil chambers to act on the main valve 18 for movement in a valve closing direction, a pilot valve 35 provided for opening and closing a pilot passage 36 communicating the auxiliary oil chamber 31 to a low pressure side one of the oil chambers such that when the pressure within the auxiliary oil chamber 31 exceeds a preset pressure the pilot valve operates to open the pilot passage 36 to allow a working fluid to escape through the auxiliary oil chamber 31 toward the low pressure side thereby to vary the force biasing the main valve toward the closing direction, and preset pressure variable means 44 for variably controlling the preset pressure, a valve body 42 and a valve opening, both of the pilot valve 35, are so configured that a pressure receiving surface of the valve body 42 and a valve seat extending along a circumferential edge of the valve opening are positioned orthogonal to the direction of opening and closing movement of the pilot valve 35.

7 Claims, 13 Drawing Sheets

Pressure Receiving Area $R = \frac{\pi}{4} D^2$

Real Opening Area $S' \doteqdot L \cdot \sin\Theta \times \pi D$

Pressure Receiving Area $R = \frac{\pi}{4}\{(\frac{5}{4}D)^2 - (\frac{3}{4}D)^2\} = \frac{\pi}{4}D^2$ Real Opening Area $S = S1 + S2$ $$= L \cdot \pi \cdot \frac{5}{4}D + L \cdot \pi \cdot \frac{3}{4}D$$

$$= L \cdot \pi \cdot 2D$$

110
44
44b
43
41
42
50a
50b
92
15
50c
50
16
17
22
26
18a
75a
75
76
74a
19
74
75b
73a
70
71
73
18
25
24
23
35
39
40
36

DAMPING FORCE VARIABLE HYDRAULIC SHOCK ABSORBER

TECHNICAL FIELD

The present invention relates to a hydraulic shock absorber adapted for variable control of damping force.

BACKGROUND ART

With shock absorbers employed in vehicles such as automobiles and motor cycles, it is desirable to variably control damping force freely according to the driving conditions and the like.

Conventionally, therefore, a damping force variable hydraulic shock absorber 60 as shown, for example, in FIG. 10 has been employed. The shock absorber 60 is of the following construction. That is, it includes upper and lower oil chambers 63, 64 defined by a piston 62 within a cylinder 61, an auxiliary oil chamber 62*b* formed within the piston 62, and a main valve 65 disposed within the auxiliary oil chamber for opening and closing a main passageway 62*a* which communicates with the two oil chambers 63, 64. The auxiliary oil chamber 62*b* is adapted to communicate with the upper and lower oil chambers 63, 64 through a check valve 62*c*. A pilot passage 62*d* for allowing the pressure within the auxiliary oil chamber 62*b* to escape is provided which can be opened and closed by a pilot valve 66, the biasing force of the pilot valve 66 in the direction of closing movement being adjustable by means of an electromagnetic coil 67.

With this prior art shock absorber 60, by controlling power supply to the electromagnetic coil 67 according to the driving conditions and the like, it is possible to control the closing force of the pilot valve 66 with respect to the pilot passage 62*d* and, in turn, the opening and closing of the main valve 65. Thus, the damping force of the working fluid, as it is generated when the fluid flows through an open clearance between the main valve 65 and the valve seat for the main passageway 62*a*, is variably controlled.

However, such prior art shock absorber 60 involves problems. One problem is low response, and another is that the pilot valve 66 is liable to axial vibration. Such problems are believed to be due to the following fact. That is, in the prior art shock absorber 60, the abutment surface (sealing surface) of the pilot valve 66 for contact with the valve seat 62*e* is of conical shape so that the area of opening defined by the pilot valve 66 and valve seat 62*e* is small relative to same strokes of the pilot valve 66.

The present invention has been developed in view of these problems with the prior art and, therefore, it is an object of the invention to provide a damping force variable hydraulic shock absorber which can exhibit improved response and inhibit pilot valve vibrations.

DISCLOSURE OF THE INVENTION

According to one aspect of the invention, as claimed in claim 1, there is provided a damping force variable hydraulic shock absorber including a main valve for opening and closing a main passageway communicating with two oil chambers, an auxiliary oil chamber for causing a pressure within a high pressure side one of the oil chambers to act on the main valve for movement in a direction of valve closing, a pilot valve provided for opening and closing a pilot passage communicating the auxiliary oil chamber to a low pressure side one of the oil chambers such that when the pressure within the auxiliary oil chamber exceeds a preset pressure the pilot valve operates to open the pilot passage to allow a working fluid to escape through the auxiliary oil chamber toward the low pressure side thereby to vary the force biasing the main valve toward the closing direction, and preset pressure variable means for variably controlling the preset pressure, the damping force variable hydraulic shock absorber being characterized in that a valve body and a valve opening, both of the pilot valve, are so configured that a pressure receiving surface of the valve body and a valve seat extending along a circumferential edge of the valve opening are positioned orthogonal to the direction of opening and closing movement of the pilot valve.

According to another aspect of the invention, as claimed in claim 2, in the shock absorber of claim 1, the valve opening comprises an annular groove, and the valve body includes an annular projection having a pressure receiving flat surface adapted to abut the flat valve seat extending along the annular edge of the annular groove.

According to another aspect of the invention, as claimed in claim 3, in the shock absorber of claim 1, the valve opening comprises a multiplicity of through-holes arranged in annular fashion, and the valve body includes an annular projection having a pressure receiving flat surface adapted to abut the flat valve seat extending annularly along the multiplicity of through-holes.

According to another aspect of the invention, as claimed in claim 4, in the shock absorber of claim 1, the valve opening is a circular through-hole, and the valve body includes a rod portion to be inserted into the circular through-hole, and a valve portion projecting annularly around the rod portion and having a pressure receiving flat surface adapted to abut the flat valve seat extending along the edge of the circular through-hole, the rod portion being slidably supported at its forward end by a slide receiver portion formed on the valve opening side for slide movement in the direction of valve travel.

According to another aspect of the invention, as claimed in any one of claims 1 to 4, the area of valve opening for each stroke of the pilot valve is set equal to or larger than the area of valve opening per stroke of the main valve.

According to a further aspect of the invention, as claimed in claim 6, a damping force variable valve assembly including the main valve, auxiliary oil chamber, pilot valve, and preset pressure variable means is incorporated in a piston fitted in a cylinder; and according to a still further aspect of the invention, as claimed in claim 7, the damping force variable valve assembly is disposed externally of the cylinder.

BEST MODE FOR CARRYING OUT THE INVENTION

Embodiments of the invention will now be described with reference to the accompanying drawings.

Figure 1:
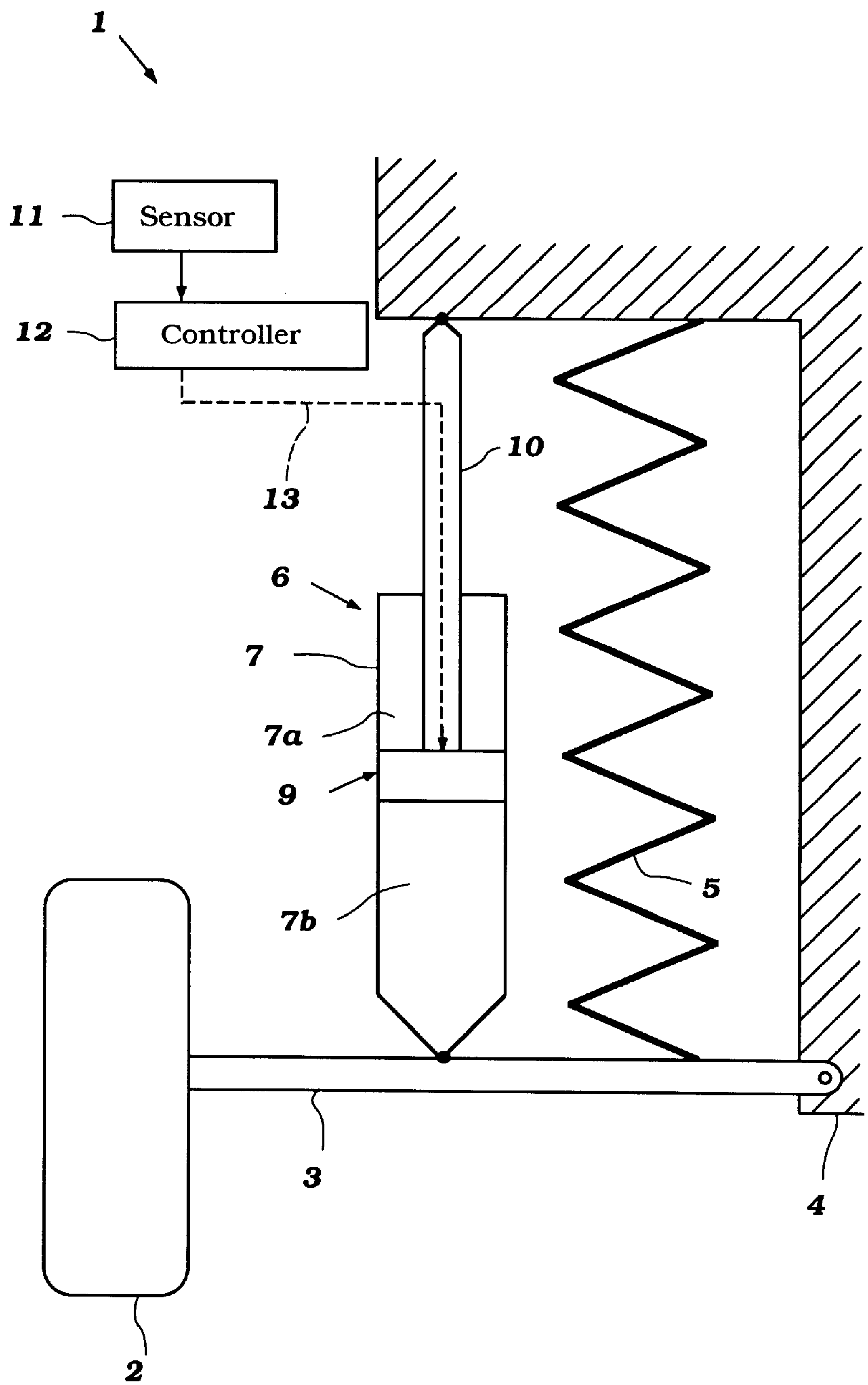
FIG. 1 is a schematic view for explaining a suspension system equipped with a shock absorber according to a first embodiment of the present invention.
Figure 2:
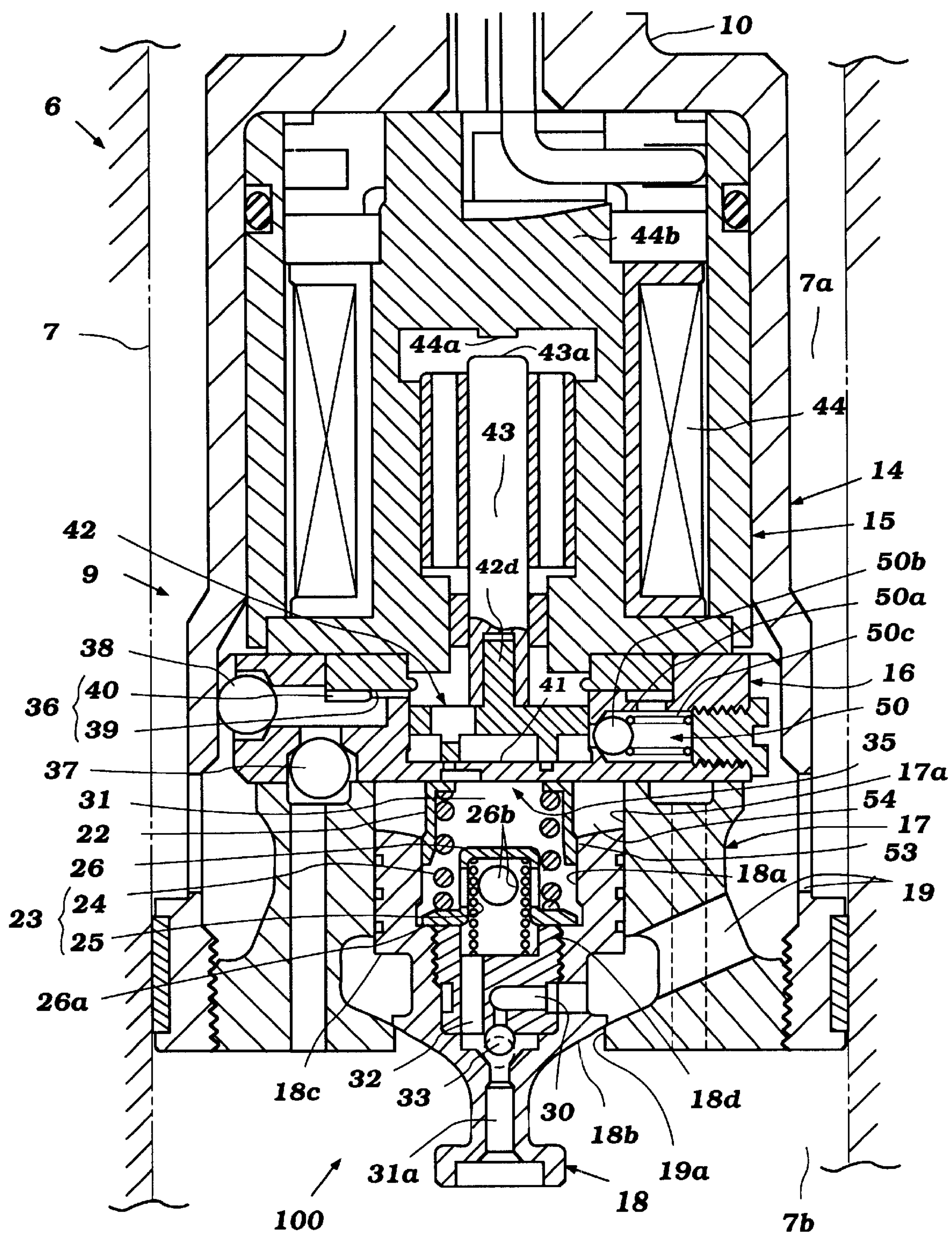
FIG. 2 is a side view in section of the first embodiment shock absorber.
Figure 3:
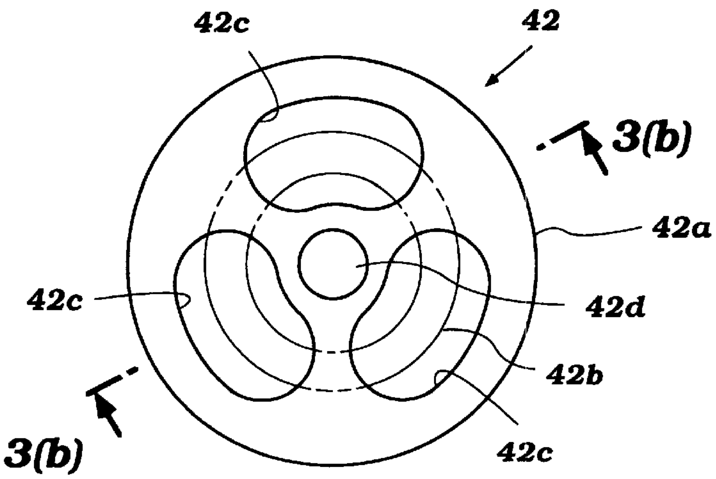
FIG. 3 is a set of views illustrating a pilot valve portion of the first embodiment shock absorber.
Figure 3:
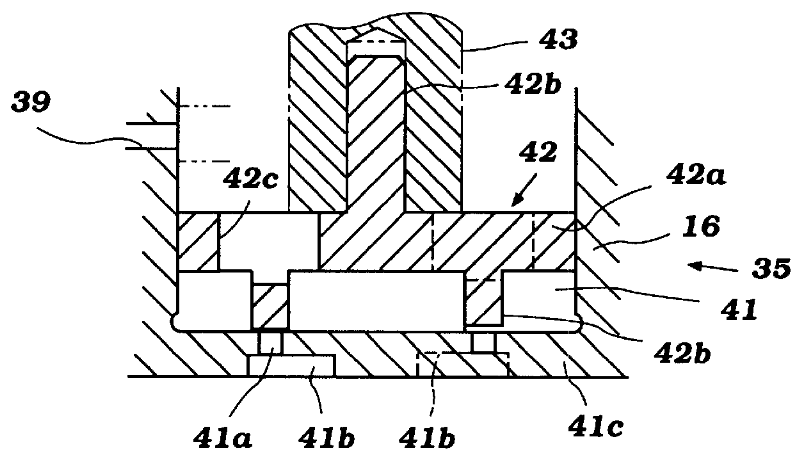
Figure 3:
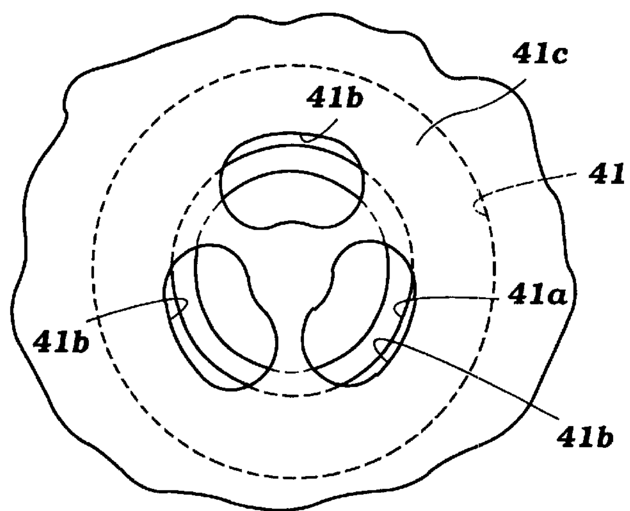
Figure 4A:
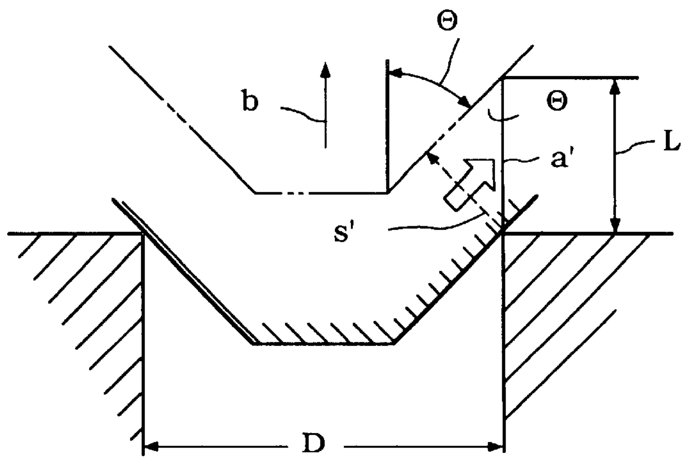
FIG. 4 is a set of characteristic diagrams explanatory of functional features of the first embodiment shock absorber.
Figure 4B:
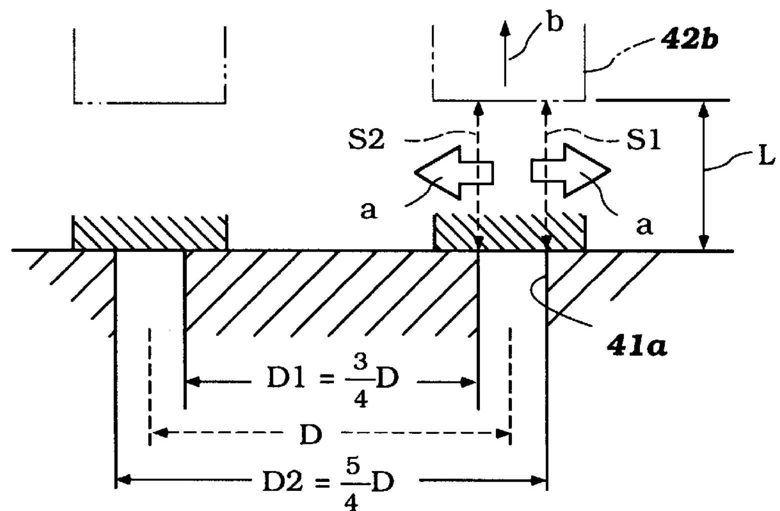
Figure 5:
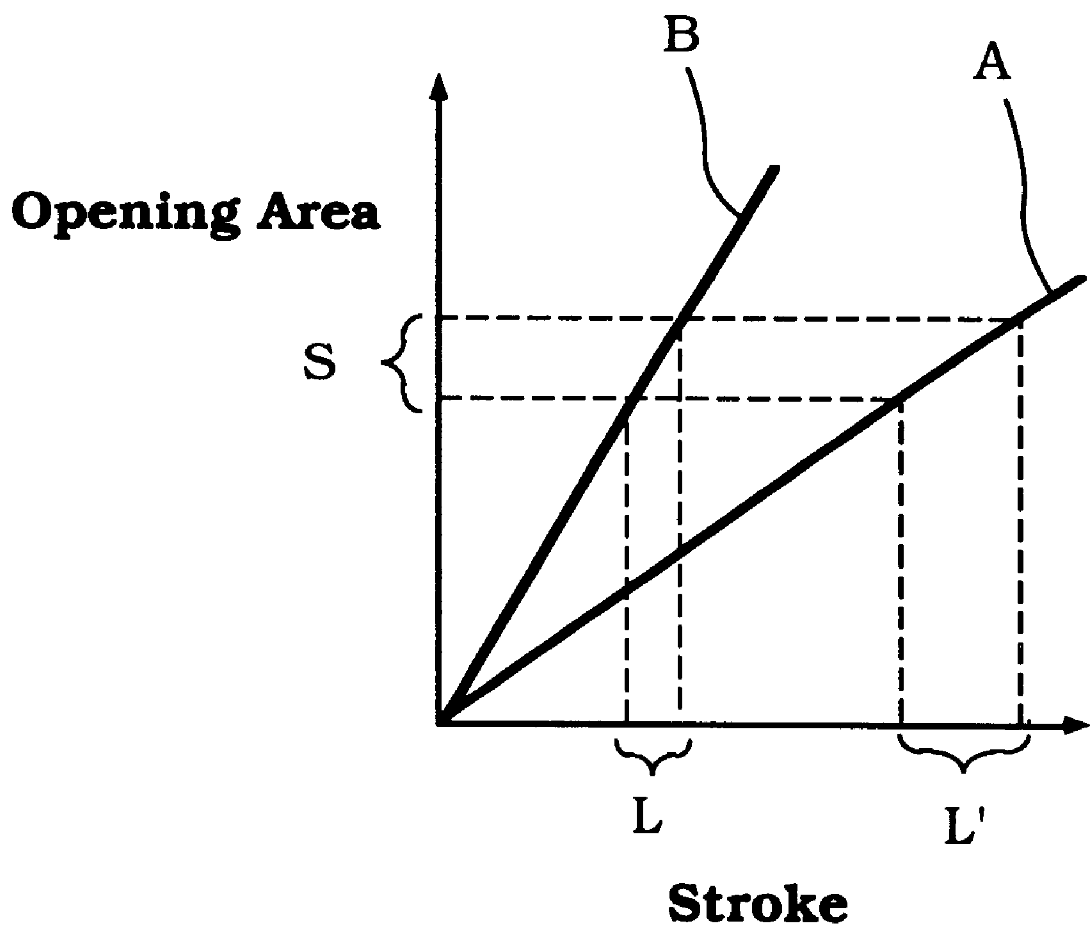
FIG. 5 is a characteristic diagram explanatory of functional features of the first embodiment shock absorber.
Figure 6:
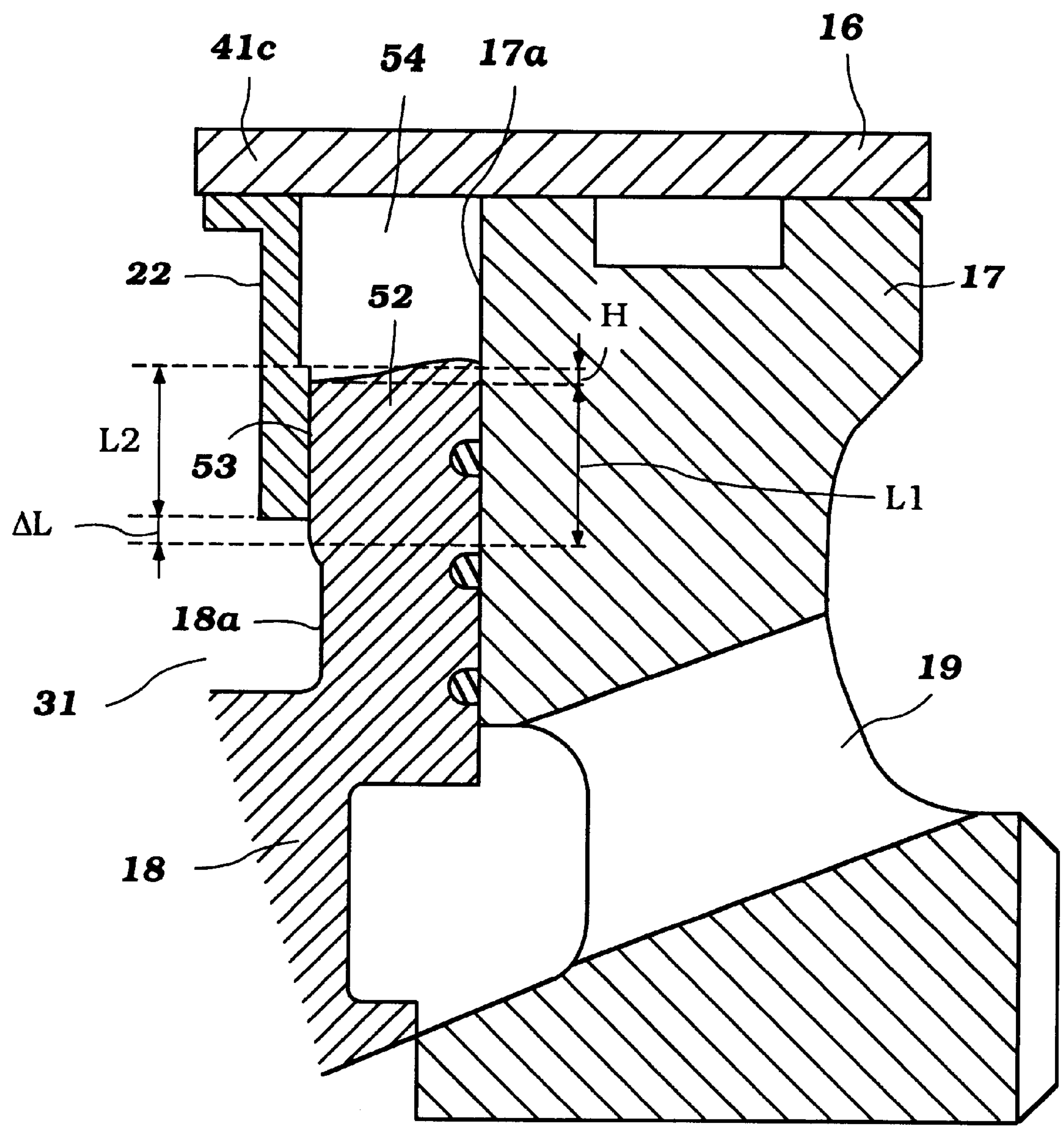
FIG. 6 is an enlarged view of a damping mechanism portion of the first embodiment shock absorber.
Figure 7:
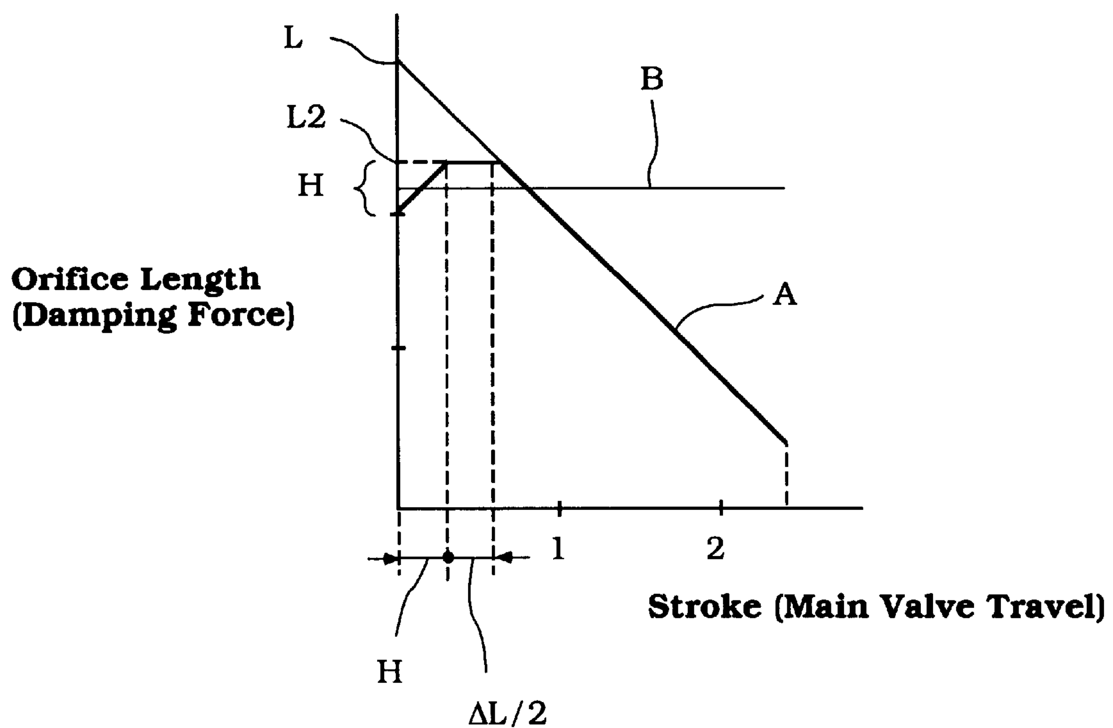
FIG. 7 is a characteristic diagram explanatory of functional effects of the first embodiment shock absorber.

FIGS. 1 through 7 are views explanatory of the damping-force variable hydraulic shock absorber in accordance with the first embodiment as defined in claims 1, 2, 5 and 6. FIG. 1 is a schematic view of a suspension system in which the shock absorber is employed; FIG. 2 is a fragmentary side view in section of the shock absorber; FIG. 3 is a view showing a pilot valve portion of the shock absorber; FIGS. 4, 5 and 7 are characteristic diagrams for explanation of functional features of the shock absorber; and FIG. 6 is an enlarged view of a damping mechanism portion.

In the drawings, numeral 1 designates a suspension system in which the shock absorber of the present embodiment is employed. The suspension system 1 includes a suspension arm 3 on which a wheel 2 is rotatably supported and which is upward and downward pivotably supported by a vehicle body 4, and a coil spring 5 and a shock absorber 6 which are interposed between the arm 3 and the vehicle body 4.

The shock absorber 6 includes upper and lower oil chambers 7*a*, 7*b* defined by a piston 9 within a cylinder 7 which is coupled at its lower end to the suspension arm 3. A piston rod 10 connected to the piston 9 is coupled at its upper end to the vehicle body 4. As the wheel 2 moves up and down, the piston 9 makes relative up and down movement within the cylinder 7 thereby to generate a predetermined damping force.

There are provided a sensor 11 for detecting data showing the speed of movement and position of the piston 9 relative to the cylinder 7, as well as the driving conditions of the vehicle, such as driving speed, steering angle, and acceleration/deceleration conditions, and a controller 12 for controlling the damping characteristics of the shock absorber 6 according to the driving conditions and on the basis of a predetermined pattern. Shown by 13 is electric wiring for interconnecting the controller 12 and the shock absorber 6.

The piston 9, as FIG. 2 shows, includes a cylindrical outer case 14 which is integrally formed at a top end thereof with a piton rod 10 and is open bottomed, the outer case 14 incorporating a damping force control valve 100. The control valve 100 includes an upper body 15, an intermediate body 16, and a lower body 17 as fitted into the outer case 14 sequentially from a lower end opening thereof, the lower body 17 being threadingly fitted into the lower end opening of the outer case 14, whereby the upper, intermediate, and lower bodies are formed into an integral unity.

The lower body 17 is axially centrally formed with a slide hole 17*a* in which a main valve 18 is vertically slidably fitted. The lower body 17 and outer case 14 are formed with a main oil passageway 19 communicating with two oil chambers, that is, the upper main oil chamber 7*a* and lower main oil chamber 7*b*. The main oil passageway 19 has an opening 19*a* which opens toward the lower main oil chamber 7*b* such that the opening 19*a* closes when the main valve 18 is at a lowered position and opens when the main valve is at an elevated position.

The main valve 18 is a bottom-closed, generally cylindrical structure, and has a recessed chamber 18*a* in an upper portion thereof and a generally mushroom-shaped lower portion with a tapered sealing surface 18*b* formed on the outer periphery thereof for abutment with the peripheral edge (valve seat) of the opening 19*a* such that the pressure in the lower main oil chamber 7*b* acts on a portion of the main valve 18 which is located lower than the sealing surface 18*b*. At a site above the sealing surface 18*b* of the main valve 18 there is formed a stepped portion 18*c* of a larger diameter than the lower portion such that the pressure in the upper main oil chamber 7*a* acts upwardly (in a valve opening direction) on the stepped portion 18*c* through the main oil passageway 19.

In an upper portion of the recessed chamber 18*a* in the upper portion of the main valve 18 there is fitted a lower portion of a resin-made or metal-made cylindrical damping ring 22 vertically slidably relative to the recessed chamber. An upper flange formed for projection into the damping ring 22 is in abutment with the underside of the intermediate body 16. A spacer 26 is disposed at the bottom of the recessed chamber 18*a*. Between the upper flange of the damping ring 22 and the bottom of a hole 18*d* formed in the spacer 26 at the bottom of the recessed chamber there is compression-fitted a double coil spring 23 through the intermediary of the spacer 26 which urges the damping ring 22 against the underside of the intermediate body 16 for securement thereto and which biases the main valve 18 downward.

The double coil spring 23 comprises larger and smaller coil springs placed in series, one over the other, with the spacer 26 interposed therebetween. The lower end of the larger coil spring 24 abuts a flange 26*a* of the spacer 26 from above, and the smaller coil spring 25 abuts at its upper end against the inner bottom of the spacer 26 and, at its lower end, against a hole 18*d* of the main valve 18. It is noted in the above connection that the size of the coil spring is preset so that when the main valve 18 is in its fully closed condition, a slight gap is defined between the underside of flange 26*a* of the spacer 26 and the bottom of the recessed chamber 18*a*.

Thus, a space surrounded by the recessed chamber 18*a* and hole 18*d* of the main valve 18, the damping ring 22, and the underside of the intermediate body 16 defines an auxiliary oil chamber 31. The interior of the hole 18*d* communicates with the upper main oil chamber 7*a* and lower main oil chamber 7*b* through a common bore 32 and further through branched oil bores 30, 31*a*, with a check valve 33 disposed at a turning point of these oil bores. The spacer 26 is formed with a communication hole 26*b* for communicating the hole 18*d* with the recessed chamber 18*a*. Thus, the higher of the pressure in the upper main oil chamber 7*a* or the pressure in the lower main oil chamber 7*b* is introduced into the auxiliary oil chamber 31.

The auxiliary oil chamber 31 is in communication with a pilot passageway 36 through a pilot valve 35, and the pilot passageway 36 is in communication with the lower main oil chamber 7*b* and the upper main oil chamber 7*a* through check valves 37 and 38 respectively.

The pilot passageway 36 comprises a plurality of radial passage portions 39 extending radially from the downstream side of the pilot valve 35 and an annular passage portion 40 connecting the radial passage portions 39, the annular passage portion 40 communicating with the check valves 37, 38.

The pilot valve 35 comprises a valve chamber 41 recessed in a stem portion of the intermediate body 16, and a valve body 42 slidably provided in the valve chamber 41, the valve body 42 being downwardly biased by a linear solenoid 44 through a plunger 43 mounted to a valve stem 42*d* of the valve body.

As FIG. 3 shows, a bottom wall 41*c* of the valve chamber 41 is formed on the upper surface thereof with an annular open groove (valve opening) 41*a*, and on the underside with three recessed grooves 41*b* of generally elliptic shape. The valve chamber 41 and the auxiliary oil chamber 31 are adapted to communicate with each other through the recessed grooves 41*b* and the open groove 41*a*.

The valve body 42 includes a disc portion 42*a* and an annular raised portion 42*b* integrally formed on the underside of the disc portion, and three through-bores 42*c* of generally elliptic shape for communication from the underside of the valve body 42 to the upper side thereof. When the valve body 42 ascends, a pilot opening is formed between the raised portion 42*b* and a peripheral edge portion (valve seat) of the open groove 41*a* such that the direction of flow of a working fluid passing through the pilot opening intersects the direction of travel of the valve body 42. It is noted in this conjunction that the underside (pressure receiving surface) of the valve seat and raised portion 42*b* crosses the direction of travel b of the valve body 42.

The linear solenoid 44 is incorporated in the upper body 15 and, when excited, applies a downward oriented force corresponding to the excitation to the valve body 42 through a plunger 43. By controlling the force of such excitation the internal pressure of the auxiliary oil chamber 31 for causing the pilot valve 35 to begin to open is varied. This control functions as set-pressure variable means of the present invention. Above-said force of excitation is controlled by the magnitude of voltage transmitted to a solenoid 44 through the electric wiring 13.

When power supply to the linear solenoid 44 is stopped, the valve body 42 ascends under the internal pressure of the auxiliary oil chamber 31 until a top end 43*a* of the plunger 43 goes into abutment with a raised portion 44*a* of a stopper 44*b* disposed at an upper end portion of the outer case 14. In this case, the radial passage portions 39 of the pilot passageway 36 are closed by the outer periphery of the disc portion 42*a*.

The intermediate body 16 is provided with a pressure adjust valve 50 for adjusting the pressure within the auxiliary oil chamber 31 to a predetermined pressure in case that the radial passage portions 39 are closed by the disc portion 42*a*. The pressure adjust valve 50 includes a communication hole 50*a* for communication between a portion of the valve chamber 41 which is located below the disc portion 42*a* and the interior of the annular portion 40 of the pilot passageway 36, and a ball 50*b* disposed in the communication hole 50*a*, the ball 50*b* being biased in the direction of valve closing.

A space surrounded by the upper end of the main valve 18, the interior surface of the main valve insert hole 17*a*, the bottom wall of the pilot valve 35, and the damping ring 22 slidably fitted in the recessed chamber 18*a* forms a damping chamber 54, the volume-of the damping chamber 54 being variable with upward and downward movement of the main valve 18, that is, the valve travel of the main valve 18.

A gap between the recessed chamber 18*a* of the main valve 18 and the outer periphery of the damping ring 22 forms an orifice 53. Thus, as the volume of the damping chamber 54 changes with a change in the valve travel of the main valve 18, the working fluid flows between the auxiliary oil chamber 31 and the damping chamber 54 through the orifice 53, whereupon a main valve damping force acting on the main valve 18 is generated. In this way, a damping mechanism is constructed for inhibiting vibration of the main valve 18.

In this conjunction, the length of the orifice 53 (damping force) is such that, as the characteristic line A in FIG. 7 shows, it becomes longer (larger) once as each stroke of the main valve 18 becomes larger, but thereafter it becomes shorter (smaller). Whilst, the characteristic line B in FIG. 7 shows that, in the prior art shock absorber, the length of the orifice (damping force) is constant at all times.

FIG. 6 shows a construction feature for achieving the above described damping force characteristic. That is, in the present embodiment, the length of an orifice forming face of the main valve 18 on the recessed chamber 18*a* side is set to L1 and the length of the orifice forming face on the damping ring 22 side is set to L2, or $\Delta L/2$ (equal to H in the present embodiment) shorter than L1, so that the upper end of the main valve-side orifice forming face is positioned lower by H than the upper end of the damping ring-side orifice forming face when the main valve is in its fully closed position.

Therefore, a practical length of the orifice is increased from $L2-\Delta L/2$, i.e., valve travel zero position, to L2, i.e., maximum length of valve travel H, and is maintained at the same length L2until the valve travel is increased by $\Delta L/2$; and thereafter it is decreased with any further increase in the valve travel.

Next, operation of the shock absorber 6 will be explained.

In the event that the wheel 2 is pushed up by any raised portion or the like of a road surface so that the shock absorber 6 goes into a compressed state, the piston 9 is relatively forced downward in FIGS. 1 and 2 to pressurize the lower main oil chamber 7*b*, whereby the working fluid is introduced from the branched oil hole 31*a* into the auxiliary oil chamber 31 through the check valve 33 and common oil hole 32 so that the auxiliary oil chamber 31 is also pressurized.

In the pilot valve 35, the open groove 41*a* has been closed by the valve body 42 under the biasing force preset by the linear solenoid 44, When a force acting on the valve body 42 in the direction of valve opening under the internal pressure of the auxiliary oil chamber 31 exceeds the biasing force, the valve body 42 moves to open the open groove 41*a* and the working fluid flows passing through the open groove 41*a*, through-holes 42*c*, and pilot passageway 36, and further through the check valve 38 into the upper main oil chamber 7*a*.

As the pilot valve 35 is opened, the internal pressure of the auxiliary oil chamber 31 is lowered and the main valve 18 is pushed upward by the pressure in the lower main oil chamber 7*b*, whereby the opening 19*a* of the main oil passageway 19 is opened to allow the working fluid to flow from the lower main oil chamber 7*b* into the upper main oil chamber 7*a*, whereupon a damping force is generated. When the pressure difference between the upper and lower main oil chambers 7*a* and 7*b* is lowered to a level below a predetermined value, the main valve 18 is allowed to return to its original position by the double coil spring 23 and the internal pressure of the auxiliary oil chamber 31 to thereby close the main oil passageway 19. The piston 9 descends while the above described mode of operation is repeated.

When the wheel 2 is lowered so that the shock absorber 6 is extended, the piston 9 is drawn relatively upwardly. As a result, the upper main oil chamber 7*a* is pressurized and the pressure generated is introduced from the main oil passageway 19 into the auxiliary oil chamber 31 through the branched oil hole 30 of the main valve 18, check valve 33, and common oil hole 32. When a force acting in the direction of valve opening under the internal pressure of the auxiliary oil chamber 31 exceeds a force acting in the direction of valve closing under the biasing force of the linear solenoid 44, the pilot valve 35 is opened to allow the working fluid to escape into the lower main oil chamber 7*b* through the pilot passageway 36 and the check valve 37. As a result, the pressure of the auxiliary oil chamber 31 is reduced, and the main valve 18 ascends under a differential pressure between the pressure of the upper main oil chamber 7*a* and the pressure of the auxiliary oil chamber 31 which acts on the stepped portion 18*c* of the main valve 18, whereby the main oil passageway 19 is opened.

Thus, the working fluid flows from the upper main oil chamber 7*a* into the lower main oil chamber 7*b* and, in this conjunction, a damping force is generated. When the pressure difference between the two main oil chambers 7*a* and 7*b* is lowered to a level below the predetermined value, the main oil passageway 19 is closed. The piston 9 ascends while the above described mode of operation is repeated.

In the present embodiment, the shape and dimensions of the pilot valve 35 are designed so that the direction of flow of the working fluid in the pilot opening, as defined by the raised portion 42*b* of the valve body 42 and the peripheral portion (valve seat) of the open groove 41*a* at the bottom of the valve chamber 41, crosses the direction of travel b of the valve body 42 or, more ideally, intersects that direction of travel in generally rectangular relation thereto. Therefore, a real valve opening area can be made greater for same pilot valve stroke as that in the prior art. Further, it is possible to obtain improved response and reduce vibrations of the pilot valve 35 in the direction of valve opening and closing.

Referring now to FIGS. 4 and 5, further description will be given with respect to above said real opening area. FIG. 4 shows the relationship between same plunger stroke and real opening area. FIG. 5 shows the relationship between same opening area and plunger stroke. FIG. 4(*a*) shows a prior art construction in which the valve body has a conical sealing surface of angle θ and a valve opening in the form of a through-hole having diameter D, with a plunger stroke designated by L. FIG. 4(*b*) shows the construction of the present embodiment in which outer and inner diameters of the open groove 41*a* are expressed by 5D/4 and 3D/4 respectively. The outer and inner diameters are designed to provide same pressure receiving area.

In the case of the conventional construction, real opening area S' is:

$$S' = L \times \cos\theta \times \pi \times D$$

In contrast, real opening area S in the case of the present embodiment is:

$$S = L \times \pi \times 2D$$

Thus, it is apparent that according to the present embodiment, with same plunger stroke as that in the prior art, the real opening area is more than two times as large as that in the conventional construction. In reality, however, the direction a of working fluid flow crosses the direction of travel b of the valve body 42 obliquely and not rectangularly thereto. Therefore, actual opening area is slightly smaller than the real opening area S.

In FIG. 5, to obtain same opening area S, a plunger stroke L' is required in the case of the prior art (shown by characteristic line A), whereas in the case of the present embodiment (shown by characteristic line B), a much smaller plunger stroke L is only required.

In this way, according to the present embodiment, the bottom wall 41*c* of the valve chamber 41 is formed with an annular open groove 41*a* as a valve opening which is to be opened and closed with the annular raised portion 42*b* to form a pilot opening between the raised portion 42*b* and the peripheral edge portion (valve seat) of the open groove 41*a*. The direction of flow a of the working fluid flowing through the pilot opening crosses the direction of movement b of the valve body 42, and the working fluid flows in two directions, outward and inward. Therefore, the real opening area relative to same plunger stroke is greater and, as a result, improved response can be obtained and pilot valve vibrations can be inhibited. In the present embodiment, two flow directions are established as stated above and, therefore, the area of opening per stroke of the pilot valve is larger than the area of opening per stroke of the main valve.

As the main valve is opened and the volume of the damping chamber 54 is decreased, the working fluid in the damping chamber 54 flows through the orifice 53 into the auxiliary oil chamber 31, whereupon a main valve damping force develops so that vibration of the main valve 18 during valve opening and, in turn, pressure variations are inhibited.

It has been found that vibrations of the main valve 18 are liable to occur in a region in which strokes of the valve (valve travel) are small, and are less liable to occur in a region in which such travel is large. In the present embodiment, the length of the orifice 53 is set to a length in the proximity of maximum length L2 from stroke (valve travel) zero of the main valve 18 and until H+ΔL/2 is reached. Therefore, each stroke (valve travel) of the main valve 18 is small and, in a region in which vibrations are liable to occur, a damping force of the damping mechanism which occurs when the working fluid flows from the damping chamber 54 into the auxiliary oil chamber 31 is a maximum value of the same order as that in the prior art. Thus, it is possible to inhibit vibrations of the main valve 18 and, in turn, pressure fluctuations.

When the stroke (valve travel) of the main valve 18 becomes larger, the length of the orifice 53 is reduced and the main valve damping force is reduced accordingly. In this way, in a region in which vibrations of the main valve 18 are not liable to occur, the main valve damping force can be reduced by the damping mechanism, it being thus possible to avoid gene ration of any unnecessary damping force.

In the present embodiment, the length of the orifice is set shorter than the maximum length L2 from valve travel zero position of the main valve 18 and until H is reached. Therefore, in a region in which valve travel of the main valve is minimal, it is possible to avoid the orifice length becoming larger than required. In this way, according to this embodiment, it is possible to produce a maximum main valve damping force where damping is required, and to control such damping force to a low level in other locations, thereby improving the response characteristics.

Figure 8:
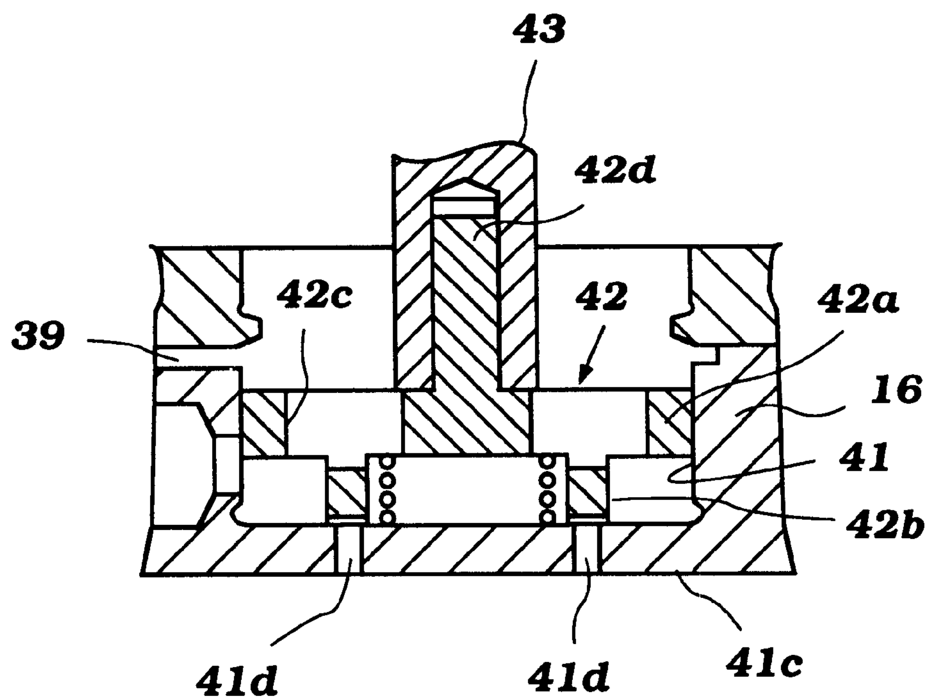
FIG. 8 is a view showing a modified form of the first embodiment.
Figure 8:
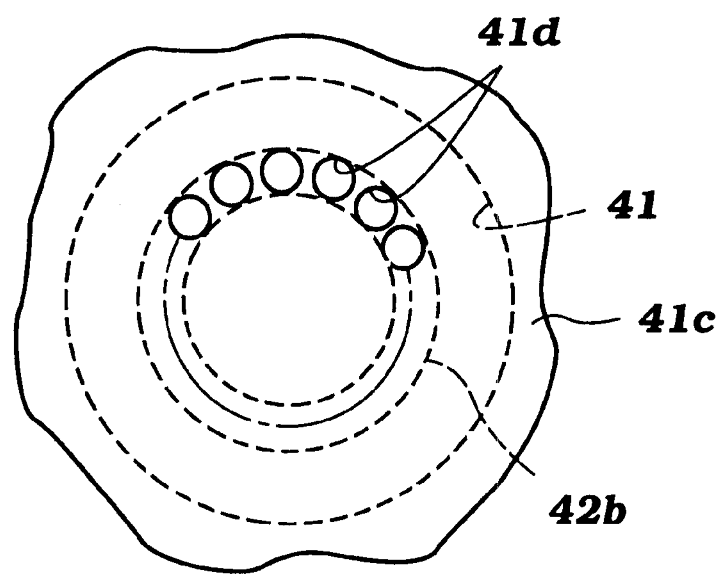

The configurations of the valve openings and valve bodies of the present invention may be modified in various ways. For example, as FIG. 8 shows, multiple through-holes 41*d* may be bored through the bottom wall 41*c* of the valve chamber 41, the through-holes 41_d_ being adapted to be closed and opened with the raised portion 42_b_ of the valve body 42. The arrangement as defined in claim 3 is exemplary of such modification. In the figure, same numerals as those in FIG. 3 designate identical or corresponding parts.

As shown, a flat valve seat formed by multiple through-holes 41_d_ is adapted to be closed and opened by a flat pressure receiving surface of an annular raised portion 42_b_, and the valve seat and the pressure receiving surface is rectangular to the direction of travel of the pilot valve. Therefore, in the same way as in the first embodiment, the area of pilot valve opening can be made larger, it being thus possible to improve the response characteristic of the shock absorber in relation to changes in driving conditions and also to inhibit vibrations of the pilot valve.

Figure 9:
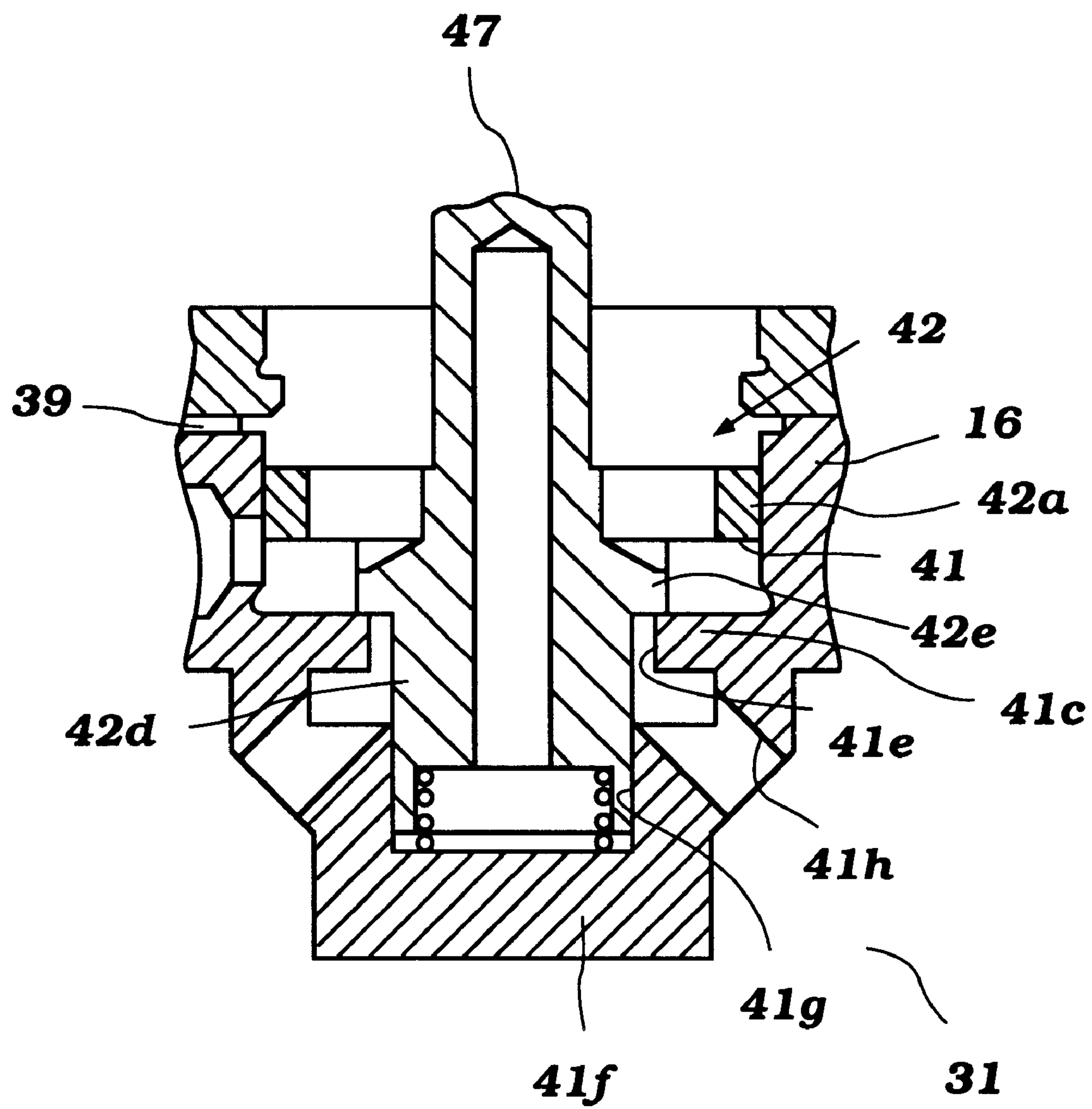
FIG. 9 is a sectional side view of a pilot valve portion of a shock absorber according to a second embodiment of the invention.
Figure 10:
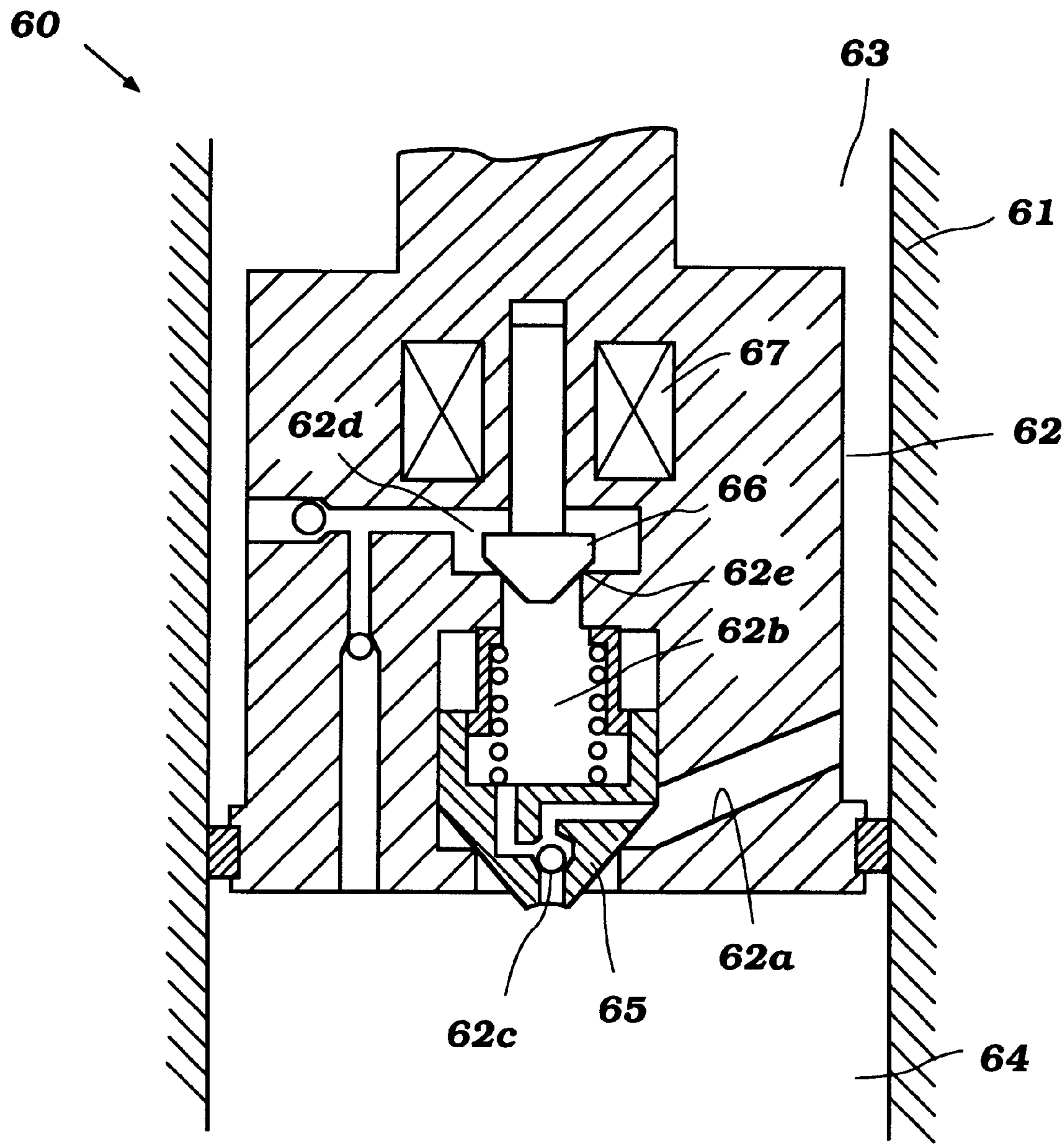
FIG. 10 is a fragmentary sectional view of a conventional shock absorber.

Next, a second embodiment based on another aspect of the invention as defined in claim 4 will be explained. FIG. 9 is a sectional side view showing a pilot valve portion of the shock absorber of the embodiment. Reference numerals identical with those in FIGS. 2 and 3 designate like parts or corresponding parts.

In this embodiment, a bottom wall 41_c_ of a valve chamber 41 is formed with a circular open bore 41_e_ and there is also formed a downward projecting guide portion 41_f_. A valve body 42 includes a rod-like portion 42_d_ of a smaller diameter than the open bore 41_e_ which extends downward, and an annularly extending valve portion 42_e_ having a flat pressure receiving surface which is formed around the rod-like portion 42_d_, the valve portion 42_e_ being abuttable against the flat valve seat formed along the peripheral edge of the open bore 41_e_. The pressure receiving surface and valve seat is rectangular to the direction of movement of the pilot valve.

A lower end portion of the rod-like portion 42_d_ is slidably and oil-tightly fitted in a guide hole (slide receiving portion) 41_g_ formed within the guide portion 41_f_. The guide portion 41_f_ is formed with an introduction hole 41_h_ for introducing the internal pressure of a pilot chamber 31 into the valve portion 42_e_.

In this embodiment, the same favorable effect as above mentioned can be obtained. Further, the rod-like portion 42_d_ of the valve body 42 is fitted in the guide hole 41_g_, and is slidably and oil-tightly supported therein. Therefore, in case that the valve body 42 vertically slides, the valve body 42 can be prevented from being inclined, so that the set pressure within the auxiliary oil chamber 31 can be stabilized. It is noted that where a disc portion 42_a_ only is supported, the valve body 42 may become inclined and, at the time of valve closing, the sealing surface (underside) of the valve portion 42_e_ does not go into full abutment with the peripheral edge of the open hole 41_e_, but a portion only abuts first and later the other portion goes into abutment. Possibly, therefore, the preset pressure within the auxiliary oil chamber may become unstable.

Figure 11:
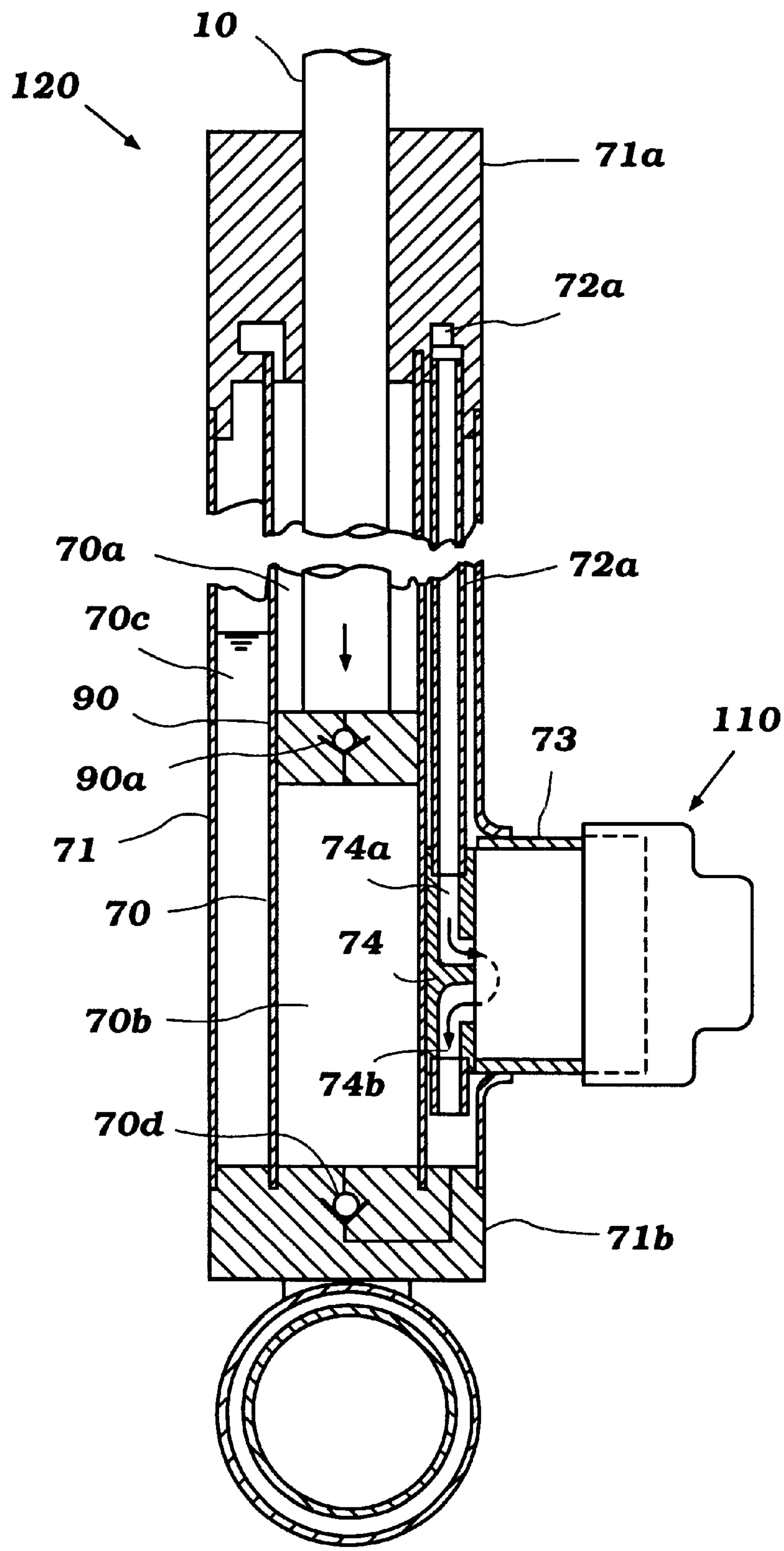
FIG. 11 is a sectional side view of a shock absorber according to a third embodiment of the invention.
Figure 12:
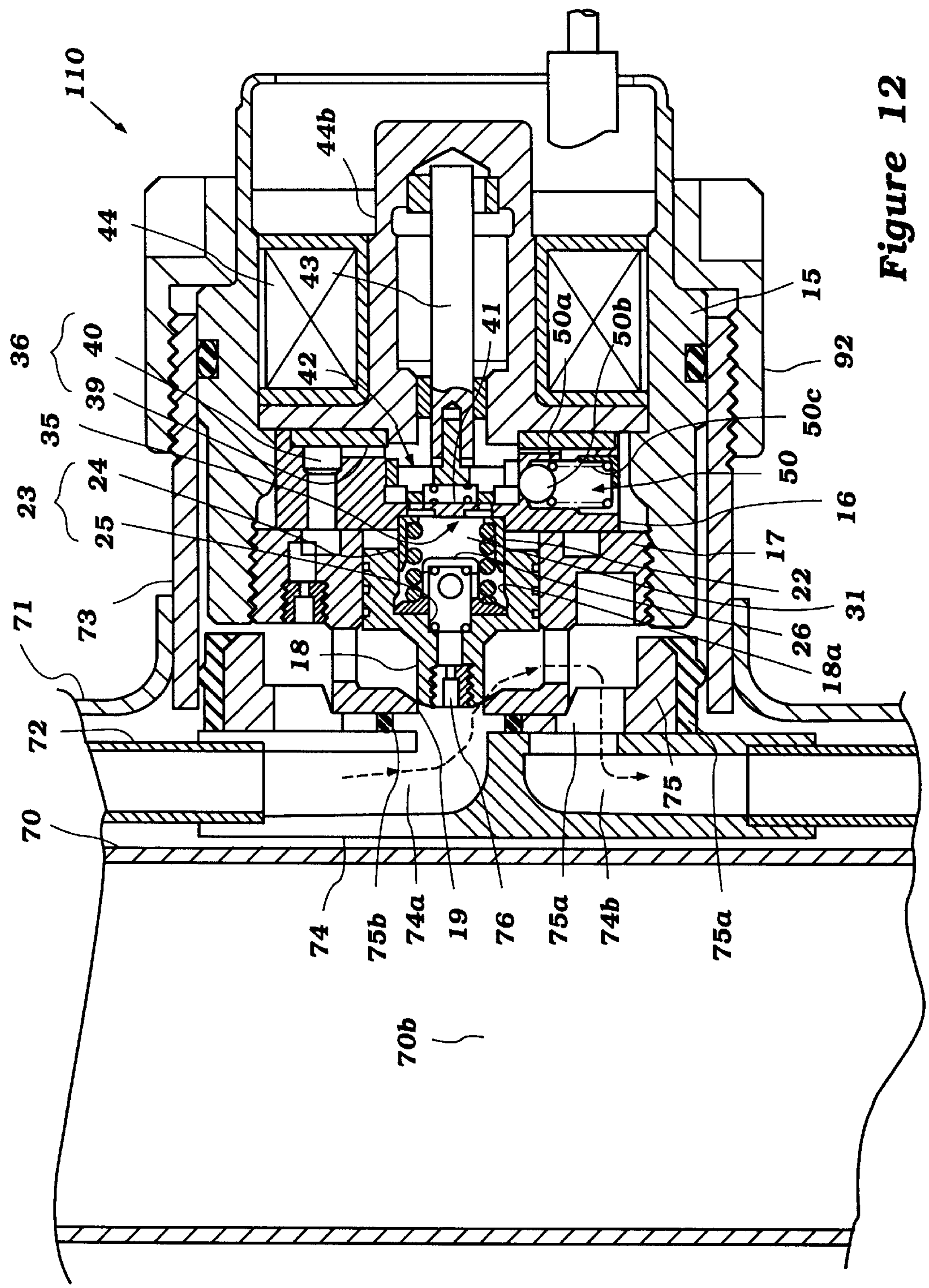
FIG. 12 is a sectional side view of a control valve of the third embodiment shock absorber.
Figure 13:
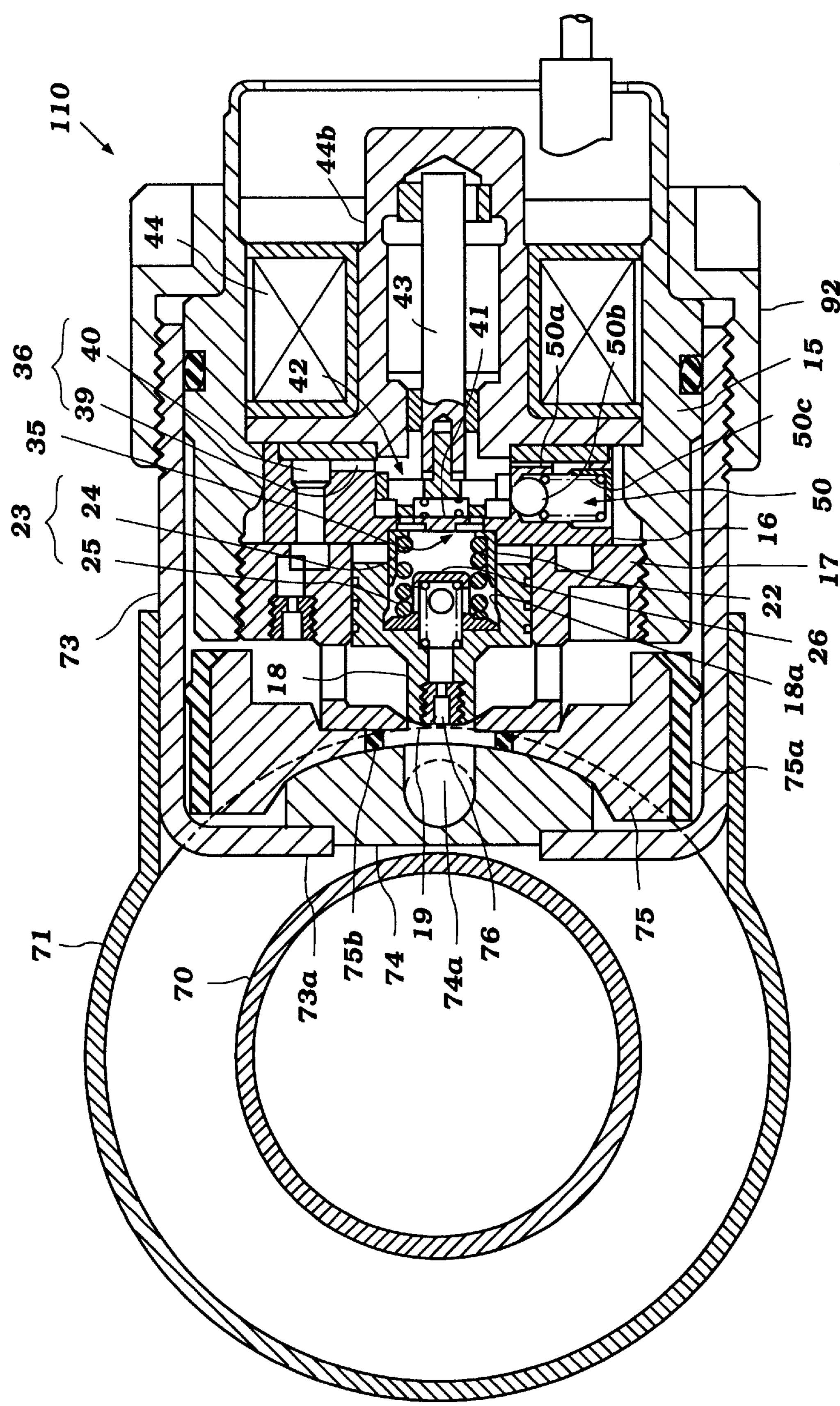
FIG. 13 is a plan view in section of the control valve of the third embodiment shock absorber.

Next, a third embodiment which relates to claims 1, 2, 5 and 7 of the invention will be explained with reference to FIGS. 11 to 13. FIG. 11 is a sectional side view of a shock absorber equipped with a damping force control valve, and FIGS. 12 and 13 are respectively a sectional side view and a plan view in section. In the figures, numerals identical with those in FIGS. 1 through 7 designate like parts or corresponding parts.

This embodiment is one example of a so-called externally fitted type in which a damping force control valve 110 is fixed to an outer wall of a shock absorber 120. The shock absorber 120 includes an inner cylinder 70 the interior of which is defined by a piston 90 into upper and lower main oil chambers 70_a_ and 70_b_, an outer cylinder 71 mounted externally of the inner cylinder 70, and an oil reservoir 70_c_ for storing surplus working fluid which is formed by a space surrounded by the outer cylinder 71, inner cylinder 70, and a rod guide 71_a_ and a choking plate 71_b_.

The piston 90 is fitted with a one-way valve 90_a_ which allows only the flow of working fluid from the lower main oil chamber 70_b_ toward the upper main oil chamber 70_a_ and prevents any reverse flow of working fluid. The checking plate 71_b_ for blocking the bottom of the inner and outer cylinders 70, 71 is fitted with a one-way valve 70_d_ which allows only the flow of working fluid from the oil reservoir 70_c_ toward the lower main oil chamber 70_b_ and prevents any reverse flow of working fluid.

A guide pipe 72 is interposed between the inner cylinder 70 and the outer cylinder 71. An upper end opening of the guide pipe 72 communicates with the upper main oil chamber 70_a_ through a communication hole 72_a_ and a lower end opening of the guide pipe communicates with an introduction hole 74_a_ of a guide member 74. The guide member 74 is a plate-like member having an arcuate outer surface such that the guide member 74 and the guide pipe 72 are inserted between the inner cylinder 70 and the outer cylinder 71 before the guide rod 71_a_ is fitted in position, whereby the guide member is held in position by a support piece 73_a_ of a support body 73. The support body 73 is of a cylindrical shape and is inserted into the outer cylinder 71 in a direction rectangular to the piston shaft, being fixed in position by welding.

The damping force control valve 110 is mounted to an outer lower portion of the outer cylinder 71 so that in either its contracted state or extended state, the working fluid in the inner cylinder 70 can flow into the oil reservoir 70_c_ through a main valve 18 of the control valve 110 and an outlet hole 74_b_. That is, in the present embodiment, the upper main oil chamber 70_a_ and oil reservoir chamber 70_c_ are communicated with each other by a main oil passageway including the guide pipe 72, the introduction hole 74_a_, and the outlet hole 74_b_.

The damping force control valve 110 includes an upper body 15 incorporating a linear solenoid 44, an intermediate body 16 incorporating a pilot valve 35, and a lower body 17 incorporating the main valve 18. Its basic construction is identical with that of the control valve 100 of the first embodiment, and the control valve is mounted to the outer cylinder 71 in the following procedure.

A sealing member 75 having rubber seals 75_a_, 75_b_ fixed by baking respectively on its outer and inner peripheries is inserted from outside into the support body 73 so that an arcuate inner surface of the sealing member 75 is brought into abutment with an arcuate outer surface of the guide member 74.

The lower body 17 is threadingly inserted into the upper body 15, to which are mounted the main valve 18, intermediate body 16, pilot valve 42, linear solenoid 44, etc. to form a damping force variable valve sub-assembly. The damping force variable valve sub-assembly is inserted into the support body 73 from outside, with a cover body 92 threadingly mounted to the support body 73 so that the forward end of the lower body 17 is brought into abutment with the sealing member 75.

When the wheel 2 is pushed up due to a raised portion of the road surface so that the shock absorber 120 goes into a compressed condition, the piston rod 10 and the piston 90 are relatively forced downward in FIG. 11. As a result, the interior volume of the cylinder is reduced by an ingress volume of the piston rod 10, and the lower main oil chamber

70*b* and the upper main oil chamber 70*a* are pressurized because of the presence of the one-way valve 90*a*. The pressure thus generated acts upon the main valve 18 through the guide pipe 72 and introduction hole 74*a* and is also introduced into the auxiliary oil chamber 31 via the orifice 76 so that the auxiliary oil chamber 31 is also pressurized.

When the force oriented in the valve opening direction which acts on the valve body 42 due to the internal pressure of the auxiliary oil chamber 31 exceeds a biasing force from the linear solenoid 44, the valve body 42 opens the open groove 41*a* and the internal pressure of the auxiliary oil chamber 31 is lowered, and the main valve 18 is opened under the pressure of the introduction hole 74*a*, whereby working fluid passes through the guide pipe 72 and control valve 110 to flow into the oil reservoir chamber 70*c* but only in a quantity corresponding to the volume of the piston rod ingress, whereupon damping force is generated.

When the wheel 2 descends so that the shock absorber 120 is extended, the piston 90 is relatively upwardly drawn. In this case, the one-way valve closed and the upper main oil chamber 70*a* is pressurized accordingly. The pressure thus generated acts upon the main valve 18 through the guide pipe 72 and introduction hole 74*a*, and is also introduced through the orifice 76 into the auxiliary oil chamber 31 so that the auxiliary oil chamber 31 is pressurized.

When the force oriented in the valve opening direction which acts on the valve body 42 exceeds a biasing force from the linear solenoid 44, the valve body 42 opens the open groove 41*a*, the internal pressure of the auxiliary oil chamber 31 is lowered, and the main valve 18 is opened by the pressure of the introduction hole 74*a*, whereupon working fluid flows into the oil reservoir chamber 70*c* through the introduction hole 74*a*. At that time, a damping force is generated. The working fluid in the oil reservoir chamber 70*c* is supplied for replenishment into the lower main oil chamber 70*b* through the one-way valve 70*d.*

According to this third embodiment, in the same way as in the first embodiment, the real opening area for same pilot valve stroke can be made larger, it being thus possible to improve the response characteristic and also to reduce vibrations of the pilot valve 35 in the direction of valve opening and closing.

Further, in the third embodiment, the control valve 110 is mounted to a side of the outer cylinder 71 and this results in a decrease in the overall axial length of the shock absorber as compared with the case where the control valve is incorporated in the piston.

INDUSTRIAL APPLICABILITY

As described above, in the damping force variable hydraulic shock absorber according to one aspect of the invention as claimed in claim 1, the configuration of the valve body and valve hole of the pilot valve is designed so that the pressure receiving surface of the valve body and the valve seat are orthogonal to the direction of opening and closing movement of the pilot valve. Therefore, a larger real opening area can be obtained for same one stroke. In other words, each stroke can be made smaller for same real opening area. Thus, the response of the shock absorber to changes in driving conditions is improved, and vibration of the pilot valve is reduced.

According to another aspect as claimed in claim 2, the valve hole is annular in shape and the annular raised portion for opening and closing the annular valve hole is formed as a valve body. According to another aspect as claimed in claim 3, the valve hole consists of multiple through-holes arranged in annular fashion and the annular raised portion for opening and closing the multiplicity of valve holes is formed as a valve body. Such arrangement provides a specific construction feature in the case where the pressure receiving surface and the valve seat are rectangular to the direction of movement of the pilot valve.

According to another aspect as claimed in claim 4, the rod-like portion of the valve body is provided with a valve portion for abutment with the peripheral edge of the circular open hole, and the rod-like portion is slidably supported by a guide hole in the direction of movement of the valve body. This prevents the valve body from becoming inclined at the time of valve closing in particular and stabilizes the pressure setting within the auxiliary oil chamber.

Further, such arrangement enables the per-stroke opening area of the pilot valve to be made equal to or larger than the per-stroke opening area of the main valve as claimed in claim 5.

According to another aspect of the invention as claimed in claim 6, the piston incorporates a damping force control valve. This avoids the control valve projecting radially of the control valve and facilitates the provision of space for placement of the shock absorber as a whole. According to another aspect of the invention as claimed in claim 7, the damping force control valve is mounted to the exterior of the shock absorber. Therefore, the axial length of the piston and of the shock absorber as a whole is made shorter as compared with that in the case where the control valve is incorporated in the piston.

What is claimed is:

1. A damping force variable hydraulic shock absorber including a main valve for opening and closing a main passageway communicating between two oil chambers, an auxiliary oil chamber for receiving a pressure from the one of said two oil chambers having the highest pressure to act on said main valve to resist opening thereof, a pilot valve provided for opening and closing a pilot passage communicating said auxiliary oil chamber to the other of said two oil chambers such that when the pressure within said auxiliary oil chamber exceeds a preset pressure said pilot valve operates to open the pilot passage to allow a working fluid to escape from said auxiliary oil chamber to vary the force resisting opening of said main valve, and preset pressure variable means for variably controlling said preset pressure, said pilot valve comprising a valve body and a valve opening controlled by said valve body, said valve opening being defined by a valve seat extending orthogonal to said valve opening, and said valve element having a seating surface extending orthogonal to said valve opening and parallel to said valve seat and closing said valve opening in a closed position of said valve body, said valve body moving from said closed position in a direction orthogonal to said valve opening to an open direction for opening said valve opening and permitting flow therethrough.

2. A damping force variable hydraulic shock absorber as defined in claim 1, wherein the valve opening comprises an annular groove, and wherein the valve body includes an annular projection having a pressure receiving flat surface adapted to abut the flat valve seat extending along the annular edge of the annular groove.

3. A damping force variable hydraulic shock absorber as defined in claim 1, wherein the valve opening comprises a multiplicity of through-holes arranged in annular fashion, and wherein the valve body includes an annular projection having a pressure receiving flat surface adapted to abut the flat valve seat extending annularly along the multiplicity of through-holes.

4. A damping force variable hydraulic shock absorber as defined in claim 1, wherein the valve opening is a circular through-hole, and wherein the valve body includes a rod portion extending through said circular through-hole and a valve portion projecting annularly around said rod portion and having a pressure receiving flat surface adapted to abut the flat valve seat extending along the edge of said circular through-hole, said rod portion having a smaller diameter than said circular through-hole and being slidably supported at its forward end by a slide receiver portion for sliding support in the direction of valve travel.

5. A damping force variable hydraulic shock absorber as defined in claim 1, wherein the area of valve opening for a given stroke of the pilot valve is set equal to or larger than the area of valve opening for the same stroke of the main valve.

6. A damping force hydraulic shock absorber as defined in claim 5, wherein a damping force variable valve assembly including the main valve, auxiliary oil chamber, pilot valve, and preset pressure variable means is incorporated in a piston fitted in a cylinder and which form the two oil chambers.

7. A damping force variable hydraulic shock absorber as defined in claim 5, wherein the damping force variable valve assembly including the main valve, the auxiliary oil chamber, the pilot valve and the present pressure variable means is disposed externally of a cylinder and piston forming the two oil chambers.

* * * * *

UNITED STATES PATENT AND TRADEMARK OFFICE
CERTIFICATE OF CORRECTION

PATENT NO. : 6,003,644
DATED : December 21, 1999
INVENTOR(S) : A. Tanaka

It is certified that error appears in the above-identified patent and that said Letters Patent is hereby corrected as shown below:

Column 14,
Line 1, "force hydraulic" should be changed to "force variable hydraulic"

Signed and Sealed this

Twenty-ninth Day of January, 2002

*Attest:*

JAMES E. ROGAN

*Attesting Officer*

*Director of the United States Patent and Trademark Office*